United States Patent
Oono (10) Patent No.: US 11,359,987 B2
(45) Date of Patent: Jun. 14, 2022

(54) PRESSURE-TEMPERATURE DETECTION UNIT WITH DECREASED MEASUREMENT DETERIORATION

(71) Applicant: DENSO CORPORATION, Kariya (JP)

(72) Inventor: Kazuyuki Oono, Kariya (JP)

(73) Assignee: DENSO CORPORATION, Kariya (JP)

( * ) Notice: Subject to any disclaimer, the term of this patent is extended or adjusted under 35 U.S.C. 154(b) by 124 days.

(21) Appl. No.: 16/925,602

(22) Filed: Jul. 10, 2020

(65) Prior Publication Data

US 2021/0018391 A1 Jan. 21, 2021

(30) Foreign Application Priority Data

Jul. 17, 2019 (JP) .............................. JP2019-132056

(51) Int. Cl.
*G01L 19/00* (2006.01)
*G01L 27/00* (2006.01)

(52) U.S. Cl.
CPC ........ *G01L 27/007* (2013.01); *G01L 19/0069* (2013.01); *G01L 19/0092* (2013.01)

(58) Field of Classification Search
None
See application file for complete search history.

(56) References Cited

U.S. PATENT DOCUMENTS

| | | | |
|---|---|---|---|
| 3,965,744 A * | 6/1976 | Gutjahr | G01D 3/032 73/708 |
| 5,781,878 A * | 7/1998 | Mizoguchi | G01N 27/4175 701/109 |
| 5,793,297 A | 8/1998 | Takeuchi et al. | |
| 2007/0156373 A1 | 7/2007 | Yamashita et al. | |

FOREIGN PATENT DOCUMENTS

JP H01-137175 A 5/1989

* cited by examiner

*Primary Examiner* — Lisa M Caputo
*Assistant Examiner* — Nigel H Plumb
(74) *Attorney, Agent, or Firm* — Posz Law Group, PLC (57) ABSTRACT

A sensor device includes a pressure-temperature detection unit and a signal processing circuit. The sensor device is configured to detect abnormalities by changing a supply voltage supplied to the pressure-temperature detection unit and to the signal processing circuit, and by monitoring changes in a pressure signal and in a temperature signal caused by changing the supply voltage.

12 Claims, 4 Drawing Sheets

pressure-temperature sensor,

PRESSURE-TEMPERATURE DETECTION UNIT WITH DECREASED MEASUREMENT DETERIORATION

CROSS REFERENCE TO RELATED APPLICATION

The present application is based on and claims the benefit of priority of Japanese Patent Application No. 2019-132056, filed on Jul. 17, 2019, the disclosure of which is incorporated herein by reference.

TECHNICAL FIELD

The present invention generally relates to a sensor system or a sensor device.

BACKGROUND INFORMATION

Conventionally, a plurality of measured quantities relating to a refrigerant, such as a refrigerant pressure and a refrigerant temperature of a refrigeration cycle apparatus, are detected, and a state quantity such as a plurality of variables is calculated from these measured quantities, and it is determined based on the calculation result whether the apparatus is normal or abnormal.

SUMMARY

It is an object of the present disclosure to provide a sensor device capable of determining a failure of the sensor device at a measured object high temperature time without deteriorating measurement accuracy of pressure measurement.

Note that the reference numbers in parentheses attached to the claim elements and the like indicate an example of correspondence between the claim elements and the like and specific components/devices and the like described in an embodiment in the following.

BRIEF DESCRIPTION OF DRAWINGS

Objects, features, and advantages of the present disclosure will become more apparent from the following detailed description made with reference to the accompanying drawings, in which.

EXPLANATION OF REFERENCE CHARACTERS

This explanation of reference characters includes indentations indicating an illustrative and non-limiting hierarchy, and includes parenthetical comments that are also illustrative and non-limiting.

1 . . . pressure-temperature sensor,
10 . . . mold member,
11 . . . adhesive,
20 . . . substrates,
   21 . . . first substrate,
   22 . . . second substrate,
   23 . . . third substrate,
24 . . . thin diaphragm,
26 . . . reference pressure chamber,
27 . . . measurement space,
28 . . . (first) wiring member (straight),
29a . . . (first) insulation layer,
29b . . . (second) insulation layer,
31 . . . (first) gauge unit,
32 . . . (second) gauge unit,
33 . . . (third) gauge unit,
34 . . . (fourth) gauge unit,
35 . . . constant current circuit,
40 . . . signal processing circuit,
42 . . . (first) bonding wires,
43 . . . (second) wiring member (U-shaped),
44 . . . (second) bonding wires,
45 . . . lead frames (VCC, VP, VT, GND),
   VCC . . . supply voltage,
   VP . . . pressure signal,
   VT . . . temperature signal,
   GND . . . ground,
50 . . . electronic control unit (ECU),
   41 . . . storage unit,
   53 . . . controller,
60 . . . harness,
V1 . . . first voltage (function of temperature), and
V2 . . . second voltage (function of pressure).

DETAILED DESCRIPTION

A sensor device according to one embodiment of the present disclosure is described with reference to FIGS. 1 to 5. The sensor device of the present embodiment includes a pressure-temperature sensor 1 for measuring pressure and temperature of a measured object, and an air-conditioner ECU 50.

The sensor device of the present embodiment is used in a heat pump system (not shown) used as an air conditioner for an electric vehicle, a fuel cell vehicle, or the like. The heat pump system includes a heat exchanger that absorbs heat of the atmosphere, a compressor that compresses the refrigerant from the heat exchanger, a condenser that heats the air flowing into the passenger compartment by the refrigerant discharged from the compressor, and a decompressor that decompresses the refrigerant discharged from the condenser, through all of the above the refrigerant circulates. The heat pump system further includes an air-conditioner ECU that controls the number of rotations of the compressor. In the present embodiment, chlorofluorocarbon is used as the refrigerant.

In such a heat pump system, when a liquid-phase refrigerant flows into the compressor, the compressor may fail, i.e., the liquid-phase refrigerant may causes a failure of the compressor. Therefore, the air-conditioner ECU determines whether the refrigerant flowing into the compressor is one of liquid-rich, vapor-rich, saturated steam, and heated steam based on the temperature of the refrigerant flowing into the compressor and the pressure of the refrigerant measured by the pressure-temperature sensor 1.

Figure 1:
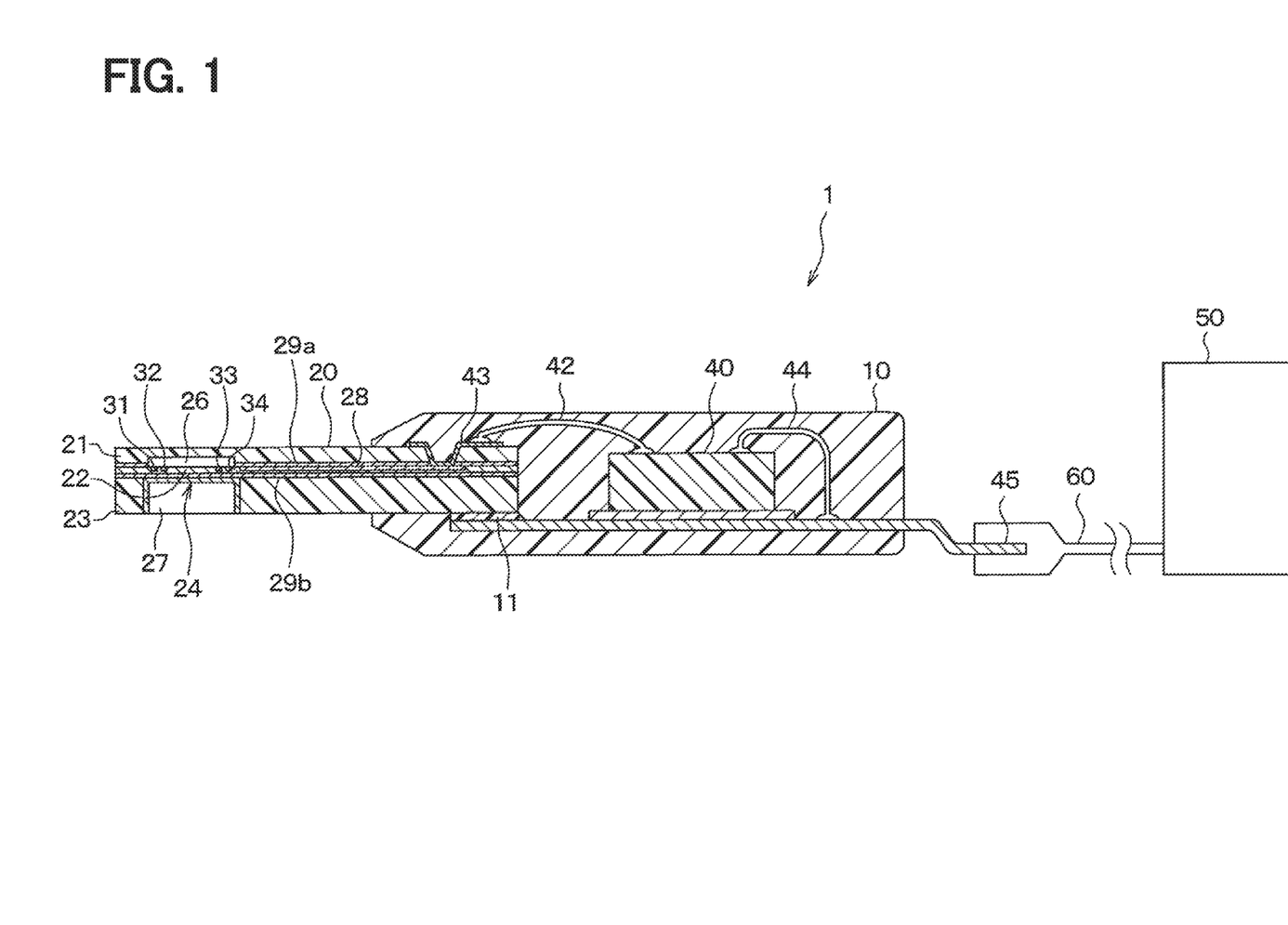
FIG. 1 is a schematic cross-sectional view of a pressure-temperature sensor of a sensor device according to one embodiment.
Figure 2:
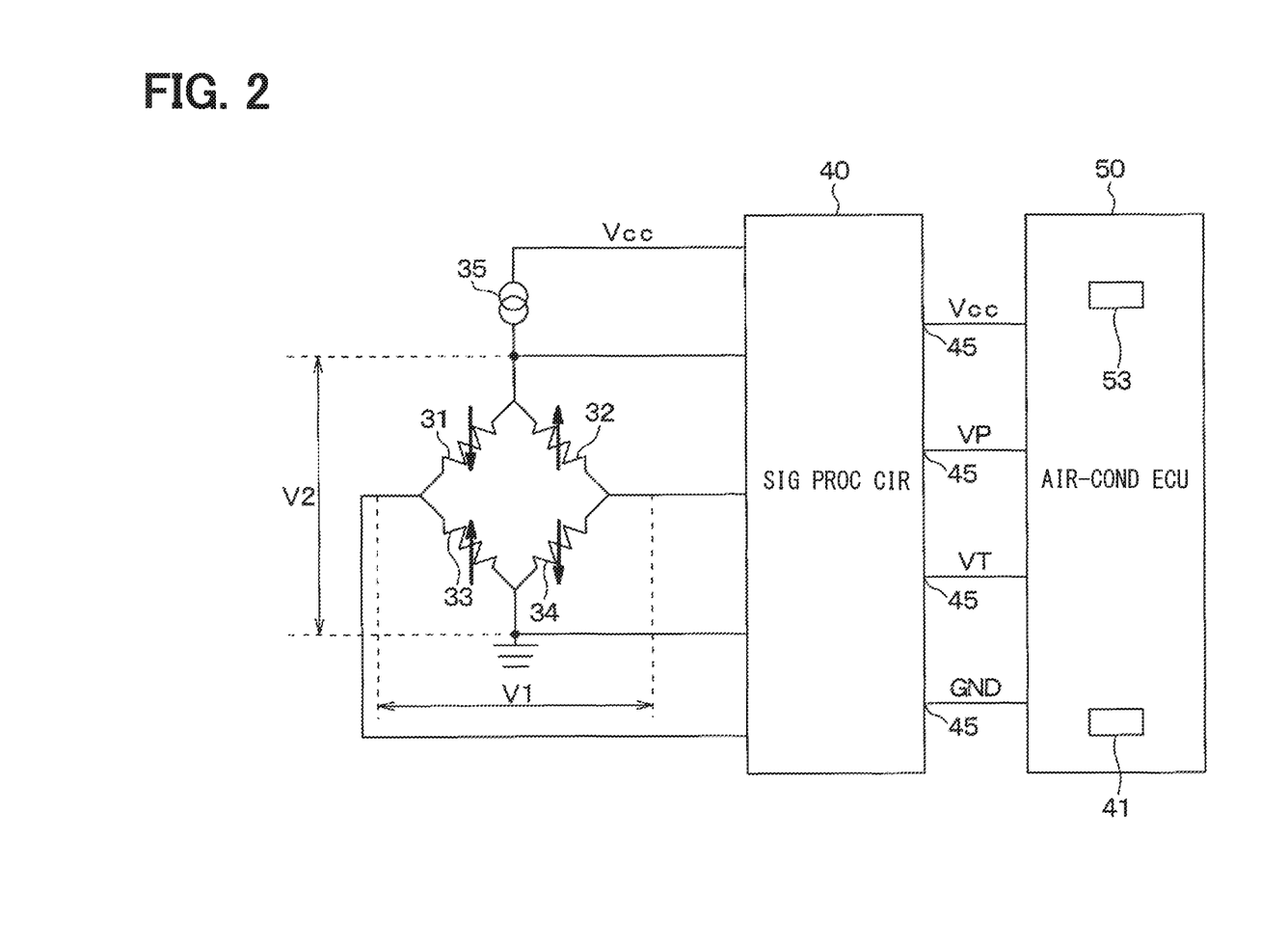
FIG. 2 is a diagram of a circuit configuration of the sensor device.

As shown in FIGS. 1 and 2, the sensor device of the present embodiment includes a pressure-temperature sensor 1 for measuring the pressure and temperature of a refrigerant (i.e., measured object) in a measurement space, and an air-conditioner ECU 50. The pressure-temperature sensor 1 and the air-conditioner ECU 50 are connected via a harness 60.

The pressure-temperature sensor 1 has a mold member 10, a substrate 20, gauge units 31 to 34, a signal processing circuit 40, a lead frame 45, and the like. The gauge units 31 to 34 correspond to a pressure-temperature detection unit.

The substrate 20 includes a first substrate 21, a second substrate 22, and a third substrate 23. An insulation layer 29a is disposed at a position between the first substrate 21 and the second substrate 22, and an insulation layer 29b is disposed at a position between the second substrate 22 and the third substrate 23.

The substrate 20 has a layered structure, in which a first substrate 21 to a third substrate 23 and the insulation layers 29a to 29b are laminated in an order of the third substrate 23, the insulation layer 29b, the second substrate 22, the insulation layer 29a, and the first substrate 21. Note that the first substrate 21, the second substrate 22, and the third substrate 23 are made of, for example, a semiconductor material such as silicon or the like.

On a surface of the first substrate 21 facing the second substrate 22, a depression for forming a reference pressure chamber 26 is provided. In addition, a concave portion for forming a measurement space 27 is provided on a surface of the third substrate 23 facing away from the second substrate 22.

The first substrate 21 and the second substrate 22 are joined, and the reference pressure chamber 26 is formed between the first substrate 21 and the second substrate 22 by a depression formed on the first substrate 21.

Further, the second substrate 22 and the third substrate 23 are joined. Further, the measurement space 27 is formed by the concave portion formed on the third substrate 23.

Further, a thin diaphragm 24 is formed at a position between the first substrate 21 and the second substrate 22. The diaphragm 24 is disposed at a position between the reference pressure chamber 26 and the measurement space 27, and is configured to warp according to a pressure difference between the reference pressure chamber 26 and the measurement space 27. Note that a portion of the third substrate 23 forming the measurement space 27 is provided with a fluorine coating for protecting the diaphragm 24 from impurities and the like.

Four gauge units 31 to 34 are arranged on the diaphragm 24. The gauge units 31 to 34 are respectively constituted by piezo-resistive elements whose resistance values change according to the amount of distortion of the diaphragm 24 (i.e., causing pressure upon the gauge units 31-34). The gauge units 31 to 34 have characteristics of changing a resistance value of the combined resistance of the gauge units 31 to 34 according to the temperature, and also according to the pressure.

On a surface of the second substrate 22 facing the first substrate 21, a wiring member 28 for connection between the gauge units 31 to 34 and the signal processing circuit 40 described later is provided.

The mold member 10 is made of a mold resin. Inside the molded member 10, four lead frames 45, the signal processing circuit 40, bonding wires 42 and 44, and the like are arranged.

A (i.e., U-shaped) wiring member 43 is provided in a portion of the mold member 10 facing the (i.e., straight) wiring member 28, and the wiring member 28 and the wiring member 43 are connected to each other. The wiring member 43 and the signal processing circuit 40 are connected by the bonding wire 42.

That is, the gauge units 31 to 34 and the signal processing circuit 40 are connected by a series including: the wiring member 28, the wiring member 43, and the bonding wire 42.

The signal processing circuit 40 amplifies a signal indicating a pressure and a signal indicating temperature respectively detected by the gauge units 31 to 34, and outputs a pressure signal corresponding to the pressure of the measured object and a temperature signal corresponding to the temperature of the measured object.

The mold member 10 is provided with the four lead frames 45 by insert molding. One end of each of the four lead frames 45 is fixed to the substrate 20 by an adhesive 11, and the other end of each of the four lead frames 45 is exposed to the outside from the mold member 10. The signal processing circuit 40 and each of the lead frames 45 are connected by a respective bonding wire 44.

The first lead frame 45 is a power supply terminal to which a voltage is supplied from the air-conditioner ECU 50, and the second lead frame 45 is a ground terminal connected to the ground. The third lead frame 45 is a signal terminal for outputting a pressure signal to the air-conditioner ECU 50, and the fourth lead frame 45 is a signal terminal for outputting a temperature signal to the air-conditioner ECU 50.

As shown in FIG. 2, the pressure-temperature sensor 1 of the present embodiment has a constant current circuit 35 and the gauge units 31 to 34.

The gauges 31 to 34 are connected to the diaphragm 24 so as to form a bridge circuit. The constant current circuit 35 supplies a constant current to the gauge units 31 to 34 connected in a bridge form.

When pressure is applied to the diaphragm 24 of the pressure-temperature sensor 1, the resistance values of the gauge units 31 to 34 change and the voltage of the bridge circuit changes. For example, when a pressure in one direction is applied to the diaphragm 24, the resistance values of the gauge units 31 and 34 decrease, and the resistance values of the gauge units 32 and 33 increase, respectively.

When pressure is applied to the diaphragm 24, a voltage V1 at a position between (i) a connection point between the gauge unit 31 and the gauge unit 33 and (ii) a connection point between the gauge unit 32 and the gauge unit 34 changes. This voltage V1 changes according to the pressure applied to the diaphragm 24.

Further, in the pressure-temperature sensor 1 of the present embodiment, when the temperature of the gauge units 31 to 34 changes, the resistance values of the gauge units 31 to 34 change and the voltage of the bridge circuit changes. More specifically, when the temperature of the gauge units 31 to 34 changes, a voltage V2 between (i) a connection point between the gauge units 31 and 32 and (ii) a connection point between the gauge units 33 and 34 changes. The voltage V2 changes according to the temperature of the gauge units 31 to 34 regardless of the magnitude of the pressure applied to the diaphragm 24. In other words, the bridge circuit includes four nodes and four gauge units 31 to 34 in the following order (i.e., counter-clockwise): first node, gauge unit 33, second node, gauge unit 34, third node, gauge unit 32, fourth node, and gauge unit 31. The first voltage V1 is a function of pressure, and is measured between the first node and third node. The second voltage V2 is function of temperature, and is measured between the second node and the fourth node.

The signal processing circuit 40 amplifies the voltage V1 between (i) the connection point between the gauge unit 31 and the gauge unit 33 and (ii) the connection point between the gauge unit 32 and the gauge unit 34, and outputs a pressure signal VP corresponding to the pressure of the measured object to the air-conditioner ECU 50.

The signal processing circuit 40 further amplifies the voltage V2 between (i) the connection point between the gauge units 31 and 32 and (ii) the connection point between the gauge units 33 and 34, and outputs a temperature signal VT corresponding to the temperature of the measured object to the air-conditioner ECU 50.

The air-conditioner ECU 50 is configured as a computer including a CPU, a memory, an I/O, and the like. The air-conditioner ECU 50 performs various processes according to a program stored in the memory. Note that the air-conditioner ECU 50 of the present embodiment includes a storage unit 41 that stores a correlation between the temperature and the pressure of the refrigerant.

Figure 3:
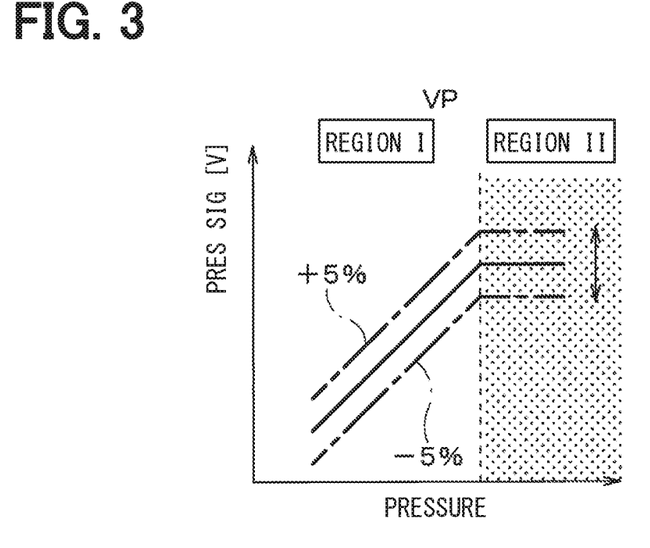
FIG. 3 is a diagram of a relationship between a pressure signal output from a signal processing circuit and a pressure when a voltage is changed.

Next, characteristics of the pressure signal VP with respect to the pressure of the measured object are described with reference to FIG. 3. FIG. 3 shows characteristics of the pressure signal VP with respect to the pressure of the measured object. In a region I where the pressure of the measured object is low, the pressure signal VP linearly increases as the pressure of the measured object increases. However, when the pressure of the measured object is in a high region II, the pressure signal VP saturates and does not change even if the pressure of the measured object increases.

Further, a solid line in FIG. 3 shows the characteristics of the pressure signal VP with respect to the pressure of the measured object when a power supply voltage VCC=5 volts. FIG. 3 also shows the characteristics of the pressure signal VP when the voltage VCC is increased by 5% (i.e., VCC=5.25 volts) and the characteristics of the pressure signal VP when the voltage VCC is decreased by 5% (i.e., VCC=4.75 volts).

The pressure-temperature sensor 1 has a ratio property, which means, when the voltage VCC changes, the pressure signal VP changes at the same rate as the change rate of the voltage VCC.

For example, if the voltage VCC of the power supply increases by 5%, the pressure signal VP also increases by 5%. Conversely, when the voltage VCC of the power supply decreases by 5%, the pressure signal VP also decreases by 5%. As described above, the pressure signal VP changes so as to follow the variation of the voltage VCC. Such a relationship is maintained in the region I where the pressure of the measured object is low and in the region II where the pressure of the measured object is high and the pressure signal VP saturates.

Figure 4:
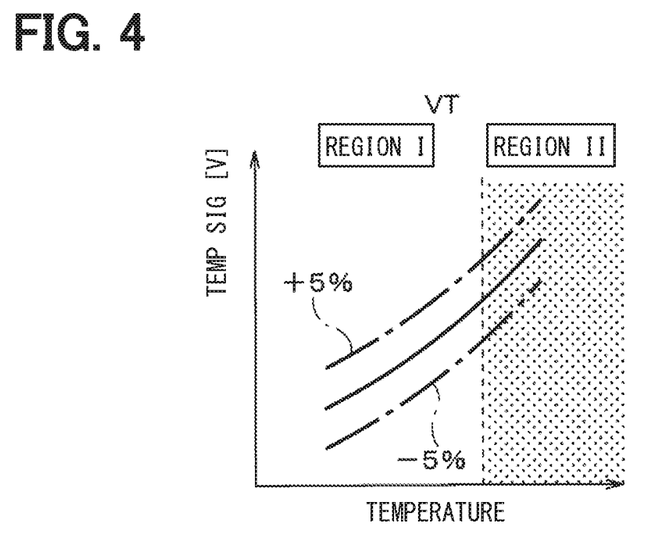
FIG. 4 is a diagram of a relationship between a temperature signal output from the signal processing circuit and temperature when the voltage is changed.

Next, characteristics of the temperature signal VT with respect to the temperature of the measured object are described with reference to FIG. 4. FIG. 4 shows characteristics of the temperature signal VT with respect to the temperature of the measured object. A region I in FIG. 4 shows a temperature range in which the temperature signal VT linearly increases, and a region II in FIG. 4 shows a temperature range in which the temperature signal VT does not linearly increase after saturation, i.e., even when the temperature of the measured object increases.

When the voltage VCC changes, the temperature signal VT changes at the same rate as the change rate of the voltage VCC. For example, when the voltage VCC of the power supply increases by 5%, the temperature signal VT also increases by 5%. Conversely, when the voltage VCC of the power supply decreases by 5%, the temperature signal VT also decreases by 5%. In such manner, the temperature signal VT changes so as to follow the variation of the voltage VCC. Such a relationship is maintained in both of the region I and the region II in FIG. 4. However, when the signal processing circuit 40 fails, neither the pressure signal VP nor the temperature signal VT follows the variation of the voltage VCC.

The air-conditioner ECU 50 controls the number of rotations of the compressor of the heat pump system and the like. Further, the air-conditioner ECU 50 of the present embodiment performs a failure determination of the pressure-temperature detection unit constituted by the gauge units 31 to 34.

Figure 5:
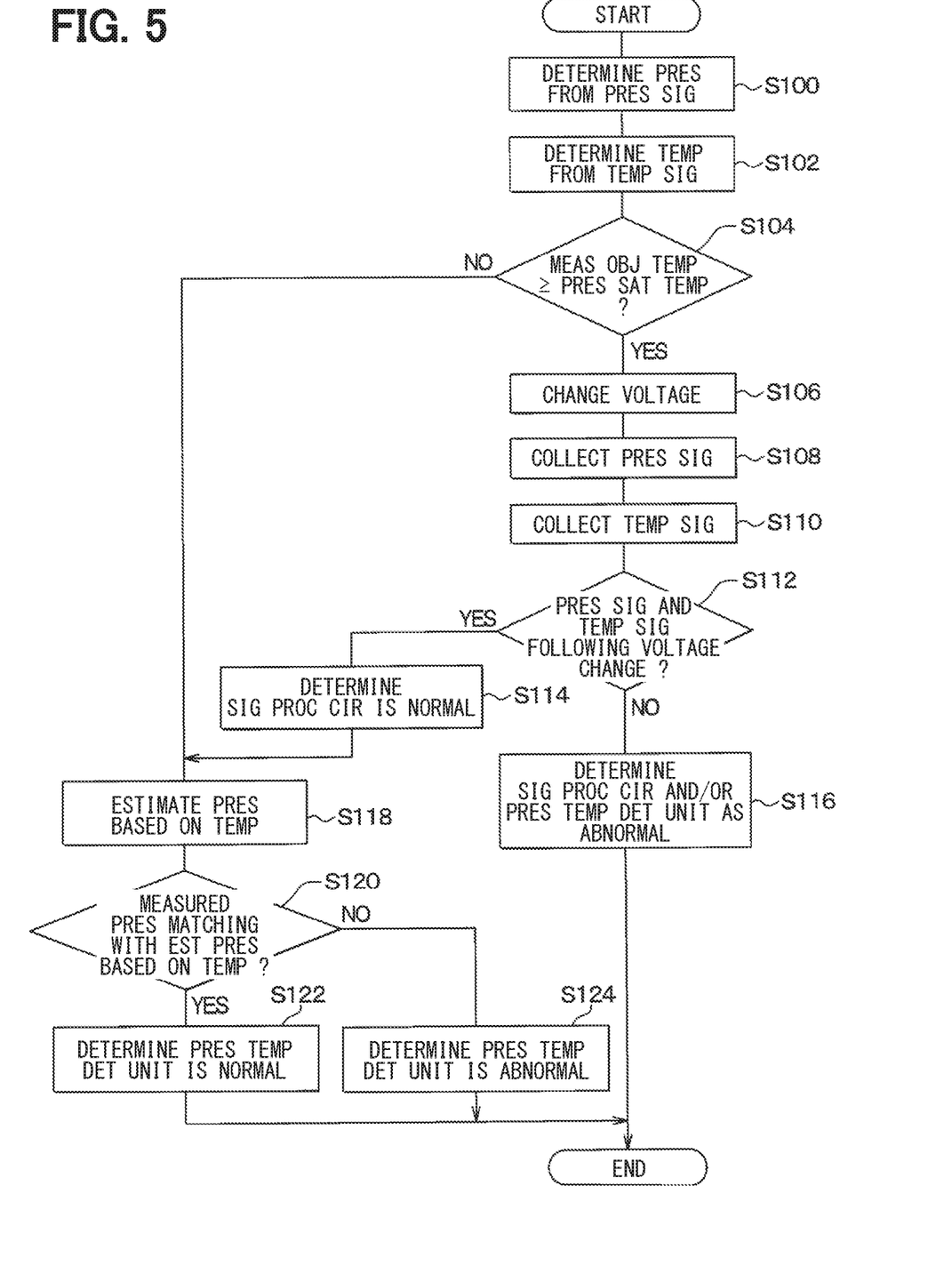
FIG. 5 is a flowchart of a process performed by an air-conditioner ECU of the sensor device.

Next, the failure determination process is described with reference to FIG. 5. When the start button of the vehicle is turned on and the power supply voltage is supplied from the vehicle to the air-conditioner ECU 50, the air-conditioner ECU 50 outputs a predetermined voltage (here, 5 volts) to the pressure-temperature sensor 1 and performs a process shown in FIG. 5 periodically.

In S100, the air-conditioner ECU 50 collects the pressure signal VP (i.e., a first pressure signal based on a first VDD voltage) output from pressure-temperature sensor 1, and determines the pressure of the refrigerant (i.e., a first pressure) from the pressure signal VP. Further, the determined pressure of the refrigerant is temporarily stored in the memory.

Next, in S102, the air-conditioner ECU 50 collects the temperature signal VT (i.e., a first temperature signal based on the first VDD voltage) output from the pressure-temperature sensor 1, and determines the temperature of the refrigerant (i.e., a first temperature) from the temperature signal VT. Further, the determined temperature of the refrigerant is temporarily stored in the memory.

In step S104, the air-conditioner ECU 50 determines whether the temperature (i.e., the first temperature) of the refrigerant (i.e., the measured object) is equal to or higher than a saturation temperature (i.e., first saturation temperature at the first pressure) at which the pressure of the refrigerant detected by the pressure-temperature sensor 1 saturates. Note that the memory of the air-conditioner ECU 50 stores a saturation temperature at which the pressure of the refrigerant (i.e., the measured object) detected by the pressure-temperature sensor 1 saturates. The air-conditioner ECU 50 determines whether the temperature of the refrigerant determined in S102 (i.e., the first temperature) is equal to or higher than the saturation temperature at which the pressure of the refrigerant detected by the gauge units 31 to 34 of the pressure-temperature sensor 1 stored in the memory saturates (i.e., the first saturation temperature).

Here, if it is determined in S104 that the temperature of the refrigerant (i.e., the measured object) is equal to or higher than the saturation temperature at which the pressure of the refrigerant (i.e., the measured object) detected by the pressure-temperature sensor 1 saturates, the air-conditioner ECU 50 changes the supply voltage supplied to the pressure-temperature sensor 1 in S106. Here, the supply voltage supplied to the pressure-temperature sensor 1 is lowered by 3% (i.e., to create a second VDD voltage).

Note that the pressure-temperature sensor 1 has a ratio property, and when the signal processing circuit 40 is normal, the pressure signal VP and the temperature signal VT output from the signal processing circuit 40 change respectively in a manner following the change of the supply voltage supplied to the pressure-temperature sensor 1.

Next, the air-conditioner ECU 50 collects the pressure signal VP (a second pressure signal based on the second VDD) in S108, and then collects the temperature signal VT in S110. Although not shown in FIG. 5, after collecting the pressure signal VP and the temperature signal VT, the air-conditioner ECU 50 returns the voltage supplied to the pressure-temperature sensor 1 to the voltage before the change. Here, the supply voltage is returned to 5 volts.

Next, in S112, the air-conditioner ECU 50 determines whether the pressure signal VP (i.e., second pressure signal) and the temperature signal VT (i.e., second temperature signal) have changed in a manner that follows the changed supply voltage (i.e., second VDD). More specifically, the pressure of the refrigerant is determined from the pressure signal VP collected in S108, and it is determined whether or not such pressure has decreased by 3% from the pressure temporarily stored in the memory in S100. Further, the temperature of the refrigerant is determined from the temperature signal VT collected in S110, and it is determined whether or not such temperature has decreased by 3% from the temperature temporarily stored in the memory in S102. Alternatively, the second pressure signal and the second temperature signal may be directly checked for changes due to changes in the supply voltage, as discussed in the next paragraph.

Here, when the pressure signal VP (i.e., second pressure signal) and the temperature signal VT (i.e., second pressure signal) have changed in a similar manner that follows the change of the voltage (i.e., second VDD), the air-conditioner ECU 50 determines in S114 that the signal processing circuit 40 is normal. More specifically, when the pressure signal and the temperature signal from the signal processing circuit 40 increase when the voltage increases, or when the pressure signal and the temperature signal from the signal processing circuit 40 decrease when the voltage decreases (i.e., as discussed above with a 3% decrease in VDD), the pressure-temperature detection unit 31-34 and the signal processing circuit 40 are determined as normal. Then, the process proceeds to S118.

When at least one of the pressure signal VP and the temperature signal VT has not changed in a manner that follows the voltage, the air-conditioner ECU 50 determines in S116 that at least one of the pressure-temperature detection unit and the signal processing circuit 40 is abnormal. More specifically, if the pressure signal or the temperature signal from the signal processing circuit 40 does not increase when the voltage increases, or if the pressure signal or the temperature signal from the signal processing circuit 40 does not decrease when the voltage decreases, then at least one of the pressure-temperature detection unit and the signal processing circuit 40 are concluded to be abnormal. Then, the present process ends.

When it is determined in S104 that the temperature of the refrigerant (i.e., the measured object) is lower than the saturation temperature at which the pressure of the refrigerant detected by the pressure-temperature sensor 1 saturates, the air-conditioner ECU 50 estimates the pressure of the refrigerant based on the humidity of the refrigerant in S118. More specifically, the correlation between the temperature and the pressure of the refrigerant is read from the storage unit 41, and, based on the temperature of the refrigerant determined in S102 (i.e., first temperature) and the correlation between the temperature and the pressure of the refrigerant read from the storage unit 41, the pressure (i.e., second pressure) of the refrigerant is estimated.

Next, in S120, the air-conditioner ECU 50 determines whether or not the measured pressure (i.e., first pressure) matches with the estimated pressure (i.e., second pressure) based on the temperature. More specifically, it is determined whether the measured pressure matches with the estimated pressure based on the temperature based on whether a difference between the pressure of the refrigerant determined in S100 and the pressure of the refrigerant estimated in S120 is equal to or less than a predetermined range. Here, when the difference between the pressure of the refrigerant determined in S100 and the pressure of the refrigerant estimated in S120 is within a predetermined range, it is determined that the measured pressure matches with the pressure estimated based on the temperature. When the difference between the pressure of the refrigerant determined in S100 and the pressure of the refrigerant estimated in S120 is outside of the predetermined range, it is determined that the measured pressure does not match with the pressure estimated based on the temperature.

Here, when the measured pressure matches with the pressure estimated based on the temperature, the air-conditioner ECU 50 determines in S122 that the pressure-temperature detection unit is normal. Also, when the measured pressure does not match with the pressure estimated based on the temperature, the air-conditioner ECU 50 determines that the pressure-temperature detection unit is abnormal in S124, and ends the processing.

As described above, the sensor device of the present embodiment includes the gauge units 31 to 34 as the pressure-temperature detection units for detecting the pressure of the measured object (i.e., refrigerant) and the temperature of the measured object in the measurement space. Further, the sensor device includes the signal processing circuit 40 that outputs the pressure signal corresponding to the pressure of the measured object detected by the pressure-temperature detection unit and outputs the temperature signal corresponding to the temperature of the measured object detected by the pressure-temperature detection unit. Further, the sensor device includes the voltage variation control unit that changes the voltage supplied to the pressure-temperature detection unit and the signal processing circuit 40. Also, the sensor device includes the failure determination unit that determines whether the pressure-temperature determination unit and the signal processing circuit 40 are normal or abnormal based on whether or not the pressure signal and the temperature signal output from the signal processing circuit change in a manner that follows the change of the voltage change by the voltage variation control unit.

According to such a configuration, when the voltage supplied to the gauge units 31 to 34 serving as the pressure temperature detection unit is changed, it is determined whether the pressure-temperature detection unit and the signal processing circuit 40 are normal or abnormal based on whether or not the pressure signal and the temperature signal output from the signal processing circuit 40 change in a manner that follows the change of the voltage. Therefore, it is possible to determine a failure of the sensor device without deteriorating the measurement accuracy of the pressure measurement when the measured object has a high temperature.

Further, the failure determination unit determines that the signal processing circuit is normal when the pressure signal and the temperature signal output from the signal processing circuit increase when the voltage is increased by the voltage variation control unit. Further, the failure determination unit determines that the signal processing circuit is normal when the pressure signal and the temperature signal output from the signal processing circuit decrease when the voltage is decreased by the voltage variation control unit.

As described above, when the pressure signal and the temperature signal output from the signal processing circuit increase when the voltage is increased by the voltage variation control unit, the signal processing circuit can be determined as normal.

In addition, the failure determination unit can determine that the signal processing circuit is normal when the pressure signal and the temperature signal output from the signal processing circuit decrease when the voltage is decreased by the voltage variation control unit.

Further, the sensor device of the present embodiment includes a saturation temperature determination unit (i) that determines the temperature of the measured object based on the temperature signal output from the signal processing circuit, and (ii) that determines whether the determined temperature of the measured object is equal to or higher than the saturation temperature at which the pressure of the measured object detected by the pressure-temperature detection unit saturates. Further, when it is determined that the temperature of the measured object determined by the saturation temperature determination unit is equal to or higher than the saturation temperature at which the pressure of the measured object detected by the pressure-temperature detection unit saturates, the voltage variation control unit changes the voltage supplied to the pressure-temperature detection unit and to the signal processing circuit.

Therefore, when it is determined that the temperature of the measured object determined by the saturation temperature determination unit is not higher than the saturation temperature at which the pressure of the measured object detected by the pressure-temperature detection unit saturates, the voltage supplied to the pressure-temperature detection unit is controlled to stay unchanged.

Further, the sensor device of the present embodiment includes the storage unit 41 that stores the correlation between the temperature and the pressure of the measured object. Further, the sensor device includes a pressure estimation unit that (i) determines the temperature of the measured object based on the temperature signal output from the signal processing circuit 40 and (ii) estimates the pressure of the measured object based on the temperature of the measured object and the correlation between the temperature and the pressure of the measured object stored in the storage unit 41.

Further, when it is determined that the temperature of the measured object determined by the saturation temperature determination unit is not equal to or higher than the saturation temperature at which the pressure of the measured object detected by the pressure-temperature detection unit saturates, the following determination is performed. That is, based on whether the difference between the pressure of the measured object estimated by the pressure estimation unit and the pressure of the measured object determined based on the pressure signal output from the signal processing circuit is equal to or less than the predetermined range, the pressure-temperature determination unit is determined as to whether the pressure-temperature determination unit and operation thereof are normal or abnormal.

Therefore, it is possible to determine whether the pressure-temperature detection unit is normal or abnormal based on (i) the temperature of the measured object and (ii) the correlation between the temperature and the pressure of the measured object stored in the storage unit 41.

Other Embodiments (1) In the above embodiment, chlorofluorocarbon is used as the refrigerant. However, the refrigerant is not limited to chlorofluorocarbon. For example, carbon dioxide or the like may also be used as the refrigerant.

(2) In the above embodiment, an example is described in which the present sensor device is used in a heat pump system as an air conditioner of an electric vehicle. However, the present sensor device can also be used in a system other than the heat pump system.

(3) In the above embodiment, in S106, the voltage supplied to the pressure-temperature sensor 1 is decreased in control (i.e., is changed to decrease). However, the voltage supplied to the pressure-temperature sensor 1 may also be increased. Further, the voltage supplied to the pressure-temperature sensor 1 may also be changed so as to repeat a decrease and an increase.

Note that the present invention is not limited to the above-described embodiment, and can be appropriately changed within the scope described in the claims. Further, the above embodiments are not independent of each other, and can be appropriately combined together except when the combination is obviously impossible. Further, in the above embodiments, individual elements or features of a particular embodiment are not necessarily essential unless it is specifically stated or unless it seems as essential in principle. Further, in the above embodiments, numerical values such as quantity, amount, a range, or the like mentioned therein are simply exemplary and not binding unless otherwise indicated, or unless described as the specific numerical value is critical. Furthermore, a material, a shape, a positional relationship, or the like, if ever determined in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

Note that the correspondence between the configuration in the above embodiment and the configuration in the claims is that the gauge units 31 to 34 correspond to a pressure-temperature detection unit, the processing in S106 corresponds to a voltage variation control unit, the processing of S114 and S116 corresponds to a failure determination unit. Further, the processing of S104 corresponds to a saturation temperature determination unit, the processing of S118 corresponds to a pressure estimation unit, and the processing of S120, S122, and S124 corresponds to a detection unit failure determination unit.

What is claimed is:
1. A sensor device comprising:
a pressure-temperature detection unit for detecting a pressure and a temperature of a measured object;
a signal processing circuit for (i) outputting a pressure signal corresponding to the pressure of the measured object and (ii) outputting a temperature signal corresponding to the temperature of the measured object;
a voltage variation control unit for changing a supply voltage supplied to the pressure-temperature detection unit and to the signal processing circuit; and
a failure determination unit for determining whether the signal processing circuit is normal or abnormal based on whether both the pressure signal and the temperature signal from the signal processing circuit change in a manner following the change of the supply voltage caused by the voltage variation control unit.

2. The sensor device of claim 1, wherein
the failure determination unit determines that the pressure-temperature detection unit and the signal processing unit are respectively normal
(i) when the voltage signal and the temperature signal output from the signal processing circuit both increase when a supply voltage increase is caused by the voltage variation control unit, or
(ii) when the voltage signal and the temperature signal output from the signal processing circuit both decrease when a voltage decrease is caused by the voltage variation control unit.

3. The sensor device of claim 1 further comprising:
a saturation temperature determination unit (i) determining the temperature of the measured object based on the temperature signal output from the signal processing circuit and (ii) determining whether the temperature of the measured object is equal to or higher than a saturation temperature corresponding to the pressure of the measured object detected by the pressure-temperature detection unit, wherein
the voltage variation control unit changes the supply voltage supplied to the pressure-temperature detection unit and to the signal processing unit when the temperature of the measured object determined by the saturation temperature determination unit is equal to or higher than the saturation temperature at which the pressure of the measured object detected by the pressure-temperature detection unit saturates.

4. The sensor device of claim 3 further comprising:
a storage unit storing a correlation between the temperature and the pressure of the measured object; and
a pressure estimation unit (i) determining the temperature of the measured object based on the temperature signal output from the signal processing circuit and (ii) estimating the pressure of the measured object based on the temperature of the measured object and the correlation between the temperature and the pressure of the measured object;
wherein the failure determination unit further determines whether the pressure-temperature detection unit is normal or abnormal based on whether a difference between (a) the pressure of the measured object estimated by the pressure estimation unit and (b) the pressure of the measured object determined based on the pressure signal output from the signal processing circuit is equal to or less than a predetermined range when the temperature of the measured object determined by the saturation temperature determination unit is not equal to or higher than the saturation temperature at which the pressure of the measured object detected by the pressure-temperature detection unit saturates.

5. A sensor system comprising:
a storage unit; and
a controller,
wherein the sensor system is configured to:
output a first supply voltage;
receive a first pressure signal and determine a first pressure
receive a first temperature signal and determine a first temperature; and
determine whether the first temperature is greater than or equal to a first saturation temperature corresponding to the first pressure.

6. The sensor system of claim 5, further configured to, upon a determination that the first temperature is not greater than or equal to the first saturation temperature:
output a second supply voltage that is not equal to the first supply voltage;
receive a second pressure signal;
receive a second temperature signal; and
determine whether the second pressure signal and the second temperature signal both changed corresponding to the change from the first supply voltage to the second supply voltage.

7. The sensor system of claim 6, further configured to, upon a determination that at least one of the second pressure signal and the second temperature signal failed to change corresponding to the change from the first supply voltage to the second supply voltage:
conclude that at least one of a signal processing circuit or a pressure-temperature detection unit is abnormal.

8. The sensor system of claim 6, further configured to, upon a determination that the second pressure signal and the second temperature signal each changed corresponding to the change from the first supply voltage to the second supply voltage:
conclude a signal processing circuit is normal;
estimate a second pressure based upon the first temperature
determine that the first pressure matches the second pressure within a predetermined range; and
determine that a pressure-temperature detection unit is normal.

9. The sensor system of claim 6, further configured to, upon a determination that the second pressure signal and the second temperature signal each changed corresponding to the change from the first supply voltage to the second supply voltage:
conclude a signal processing circuit is normal;
estimate a second pressure based upon the first temperature;
determine that the first pressure does not match the second pressure within a predetermined range; and
determine that a pressure-temperature detection unit is abnormal.

10. The sensor system of claim 5, further configured to, upon a determination that the first temperature is not greater than or equal to the first saturation temperature:
estimate a second pressure based upon the first temperature;
determine that the first pressure matches the second pressure within a predetermined range; and
determine that a pressure-temperature detection unit is normal.

11. The sensor system of claim 5, further configured to, upon a determination that the first temperature is not greater than or equal to the first saturation temperature:
estimate a second pressure based upon the first temperature
determine that the first pressure does not match the second pressure within a predetermined range; and
determine that a pressure-temperature detection unit is abnormal.

12. A sensor system comprising:
an electronic control unit including a storage unit and a controller;
a harness; and
a pressure-temperature sensor,
wherein the pressure-temperature sensor includes:
a mold member;
an adhesive;
substrates including: a first substrates, a second substrate, and a third substrate;

a thin diaphragm;
a reference pressure chamber;
a measurement space;
a first wiring member that is substantially straight;
a first insulation layer located substantially on a lower surface of the first substrate;
a second insulation layer located substantially on a lower surface of the second substrate;
at least four gauge units substantially forming a pressure-temperature detection unit,
a constant current circuit electrically connected to two of the gauge units;
a signal processing circuit;
first bonding wires connecting the first wiring member to the signal processing circuit;
second bonding wires;
four lead frames for a supply voltage, a pressure signal, a temperature signal, and a ground;
and
wherein the sensor system is configured to:
output a first supply voltage;
receive a first pressure signal and determine a first pressure;
receive a first temperature signal and determine a first temperature; and
determine whether the first temperature is greater than or equal to a first saturation temperature corresponding to the first pressure, and
wherein the harness connects the lead frames to the electronic control unit.

* * * * *